United States Patent [19]

Helber

[11] Patent Number: 5,149,122
[45] Date of Patent: Sep. 22, 1992

[54] ADJUSTABLE HITCH ASSEMBLY

[76] Inventor: Robert A. Helber, 1115 N. Ash, Layton, Utah 84041

[21] Appl. No.: 692,183

[22] Filed: Apr. 26, 1991

[51] Int. Cl.⁵ .............................................. B60D 1/00
[52] U.S. Cl. .............................. 280/491.2; 280/491.1; 280/495
[58] Field of Search ................. 280/491.1, 505, 491.2, 280/491.5, 482, 495, 456.1, 415.1, 490.1; 293/117

[56] References Cited

U.S. PATENT DOCUMENTS

| | | | |
|---|---|---|---|
| 3,164,399 | 1/1965 | Lugash | 280/491.1 |
| 4,032,170 | 6/1977 | Wood | 280/495 |
| 4,202,562 | 5/1980 | Sorenson | 280/482 |
| 4,648,617 | 3/1987 | Hannappel | 280/456.1 |
| 4,662,647 | 5/1987 | Calvert | 280/491.5 |
| 4,738,464 | 4/1988 | Putnam | 280/505 |
| 4,832,358 | 5/1989 | Bull | 280/491.5 |

Primary Examiner—H. Grant Skaggs
Attorney, Agent, or Firm—Trask, Britt & Rossa

[57] ABSTRACT

An adjustable hitch assembly 10 comprising a receiver unit 18 slidably engaged with connector arms 20 that are in turn slidably engaged with a vertical attachment post 26 by means of a coupler 22 to enable adjustment of the hitch assembly 10 in three dimensions. Readjustment is easily made by using fasteners to connect the components of the adjustable hitch assembly 10 together. Preformed hole patterns in the flanges 30 and in the arm 44 of the connector 20 accommodates standard hole patterns in vehicle frame rails and standard spacing of vehicle frame rails 14. With the present invention the adjustable hitch assembly 10 can be attached to most commercially available vehicles by the average vehicle owner, and later adjustment can be made to accommodate different configurations or heights of trailer tongues.

15 Claims, 5 Drawing Sheets

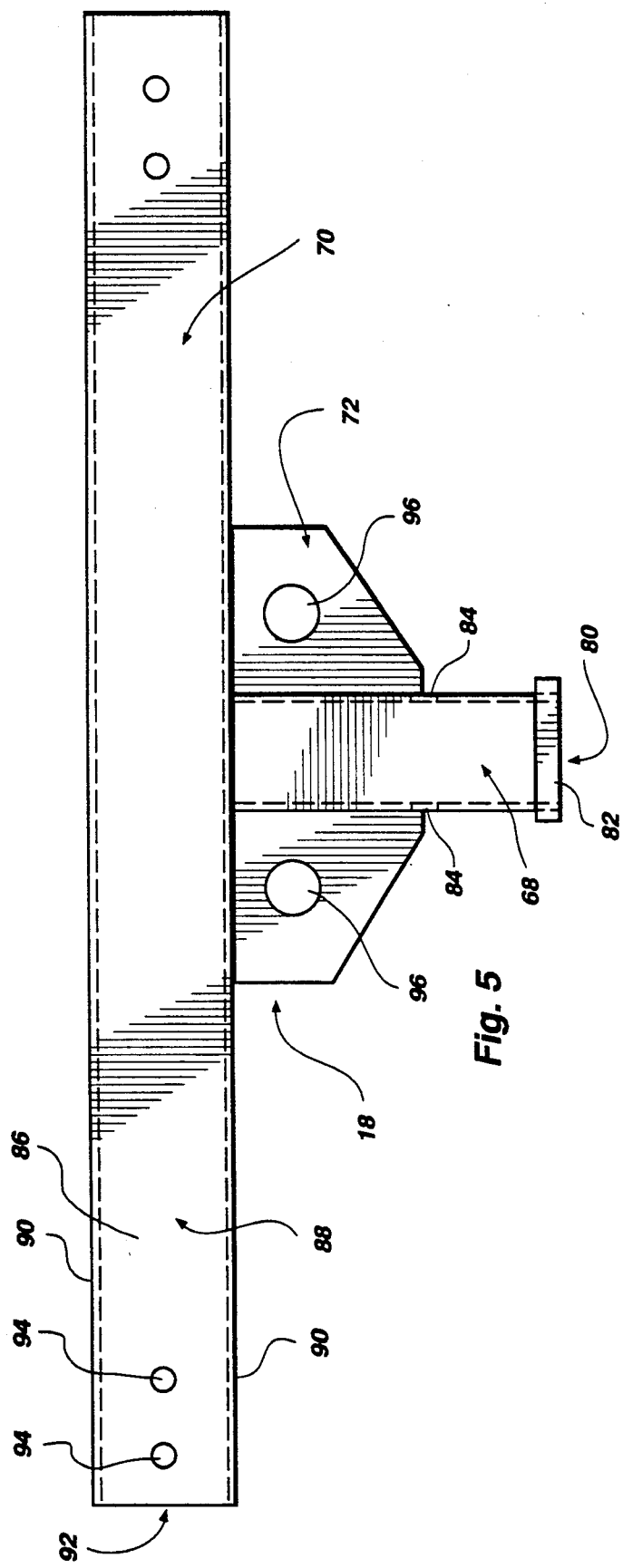
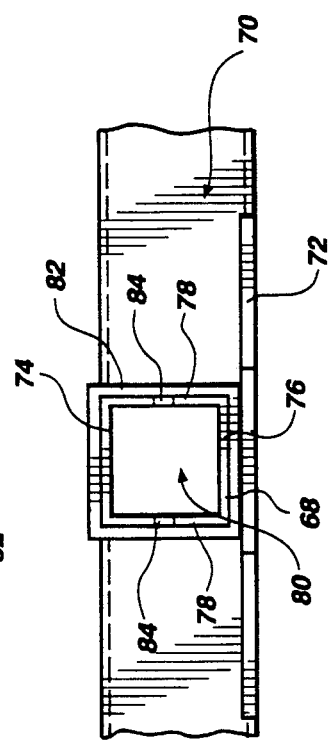

ADJUSTABLE HITCH ASSEMBLY

TECHNICAL FIELD

The present invention pertains to hitches that enable the attachment and towing of trailers by motor vehicles and, more particularly, to a hitch assembly that is adjustable in width, height, and depth to permit precise attachment and alignment of the hitch assembly on the motor vehicle and enable later adjustment in the position of the hitch assembly to accommodate trailers of different configurations.

BACKGROUND OF THE INVENTION

Motor vehicles such as pickup trucks, vans, automobiles, motor homes, etc., are typically constructed to have a pair of mutually-opposing parallel frame members or rails on which is mounted a body and front and rear bumpers. To enable towing of boats, camper trailers, motorcycle trailers, and other recreational or commercial trailers, these motor vehicles must be adapted to allow the trailer to be attached to the rear of the vehicle. Typically, a receiver ball is mounted on the center of the rear bumper of the motor vehicle, and the trailer is then coupled to the receiver ball. However, the disadvantage of this arrangement is the limited load carrying capacity of bumpers. In addition, many modern automobiles do not have rear bumpers designed to support the load of a trailer or permit attachment of a receiver ball.

As a consequence of the foregoing, trailer hitches have been developed that attach directly to the motor vehicle frame rails. This transfers the load of the trailer directly to the vehicle frame, where heavier loads can be tolerated. In addition, receiver tubes have been developed that are stronger and enable coupling with a greater variety of trailer tongues. However, there are a number of disadvantages to these types of hitches. First, these hitches are usually custom made to fit the particular vehicle, thus requiring the use of an expert craftsman in designing, constructing, and attaching the hitch to the vehicle frame. As a consequence, most vehicle owners must rely on the costly services of these skilled craftsmen. In addition, while many of these types of hitches permit adjustment in one or possibly two directions, they do not permit adjustment in all three directions, i.e., height, width, and depth. As a result, the usefulness of these hitches is limited only to the vehicles that they are sized to fit and to towing trailers that are of a suitable size and height for the hitch. Consequently, there is a need for a hitch of a universal type that can be quickly and easily fitted to a vehicle frame by the average vehicle owner and adjusted to meet the size requirements of the vehicle and the trailer to be towed, not only at the time the hitch is mounted on the vehicle, but at any time during the life of the hitch and the vehicle.

SUMMARY OF THE INVENTION

The present invention is directed to an adjustable hitch assembly for vehicles having a pair of mutually-opposing parallel frame members or rails on which is mounted a body and one or more bumpers. The adjustable hitch assembly preferably comprises a receiver having a crossbar mounted thereto that is preferably reinforced by a plate. The crossbar functions as a yoke to receive in each end thereof in slidable engagement a connector having two arms at substantially a right angle. The first arm of each connector is suitably sized to be slidably engaged with a corresponding end of the crossbar. An attachment member having an L-shaped bracket and a post attached thereto is adapted to be connected to the vehicle frame rails such that the post will depend downward. A pair of couplers have a first end that is sized and shaped to slidably engage the other arm of each connector to enable adjustment in the depth of the hitch assembly, and a second end that is sized and shaped to slidably engage the post on the attachment member to enable adjustment in the height of the hitch assembly. With the connector arm slidably engaged in the crossbar, the width of the hitch assembly can also be adjusted. Bolts received through openings in the hitch assembly firmly hold the components in place such that the hitch assembly is adjustable in all three dimensions.

In accordance with another aspect of the present invention, slidable adjustment in width, depth, and height is made along axes that are substantially at right angles to one another.

In accordance with yet another aspect of the present invention, the crossbar can be removably attached to the bottom wall of the vehicle bumper to strengthen the attachment of the hitch assembly to the vehicle and to reinforce the bumper.

In accordance with a further aspect of the present invention, the coupler can be configured to coact with the connector arms to enable adjustment in width and depth and to coact with the vertical attachment post to enable adjustment in height.

In accordance with yet a further aspect of the present invention, the coupler can be configured to enable adjustment in width and height and to coact with the connecting arm to permit adjustment in depth.

As will be readily appreciated from the foregoing description, the present invention provides an adjustable hitch assembly that facilitates positioning of the hitch in all three dimensions. That is, the hitch assembly is adjustable in width, height, and depth to precisely fit the vehicle frame rails and adapt to the position of the vehicle body and bumper. In addition, the receiver tube of the hitch assembly can be moved in all three dimensions to align with a trailer tongue. These adjustments can be quickly and easily made at any time. Furthermore, the adjustable hitch assembly of the present invention does not require the use of a skilled craftsman. Rather, the average vehicle owner can attach the hitch assembly to a vehicle using readily available hardware, such as bolts and nuts. A universal bolt pattern in the attachment members allows the attachment of the hitch assembly to most conventional vehicle frame rails.

BRIEF DESCRIPTION OF THE DRAWINGS

The foregoing and other features and advantages of the present invention will be more readily appreciated as the same becomes understood from the following detailed description when taken in conjunction with the drawings, wherein:

FIG. 5 is a top plan view of a receiver assembly formed in accordance with the present invention;

FIG. 6 is a front plan view of the central portion of the receiver assembly of FIG. 5.

DETAILED DESCRIPTION

Figure 1:
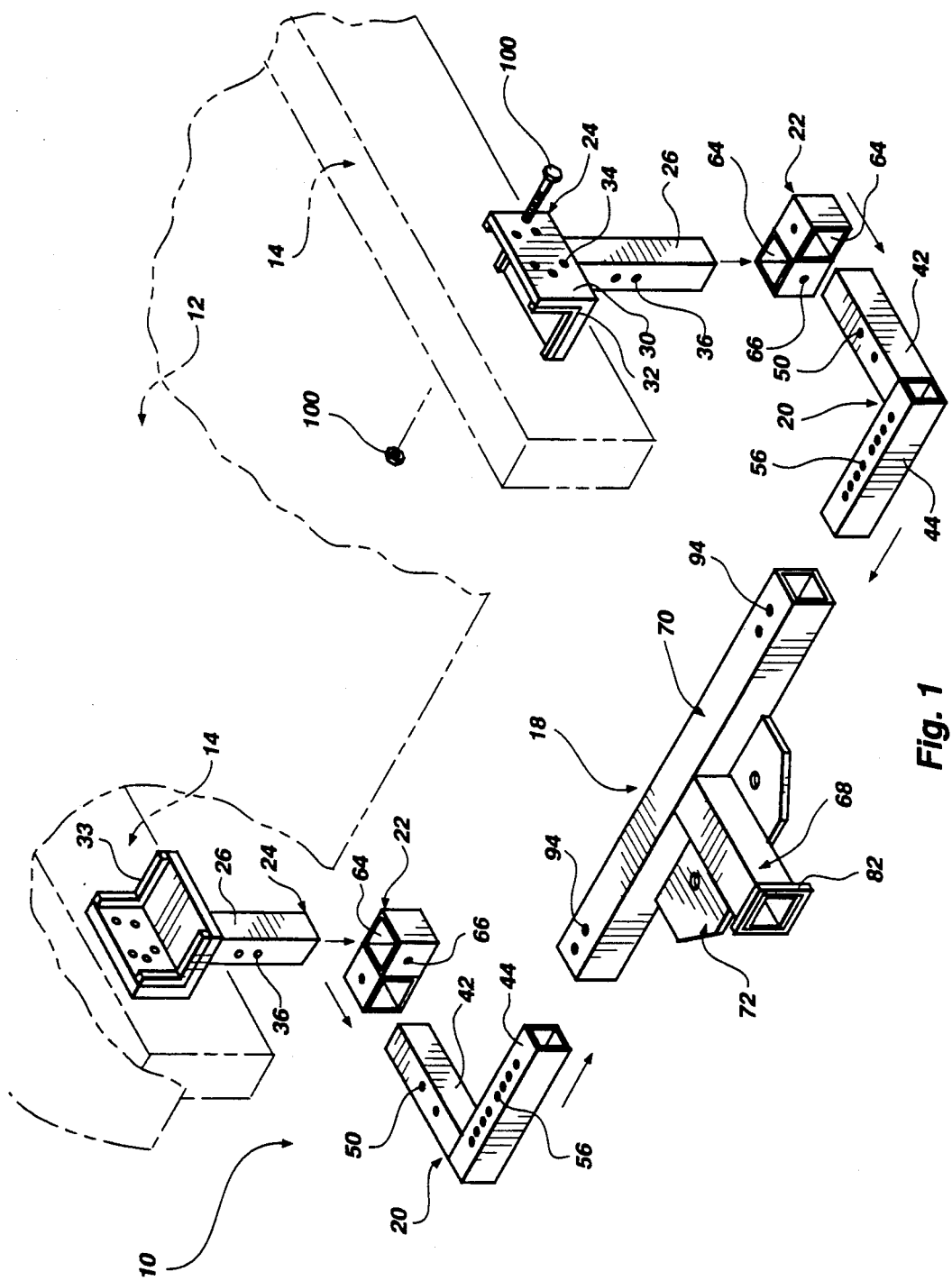
FIG. 1 is an exploded isometric view of an adjustable hitch assembly formed in accordance with the present invention.

Referring initially to FIG. 1, illustrated therein is a representative embodiment of an adjustable hitch assembly 10 formed in accordance with the present invention. The adjustable hitch assembly 10 is illustrated in exploded format to more clearly show the relationship of each of the components. For purposes of illustration, shown in phantom is a motor vehicle body 12 that is mounted to a pair of mutually-opposed parallel frame rails 14. Also mounted to the rails 14 is a rear bumper 16, shown in phantom in FIG. 7. It is to be understood that the present invention is designed for use with automobiles, vans, pickup trucks, utility trucks, motor homes, and other similar motor vehicles where it is desirable to tow a trailer or other towable vehicle.

Still referring to FIG. 1, the adjustable hitch assembly 10 includes a receiver unit 18 adapted to slidably receive a pair of connectors 20 for adjusting the width of the assembly 10. A pair of couplers 22 coact with the connectors 20 and a pair of attachment members 24 to enable adjustment in the depth and height of the adjustable hitch assembly 10. The attachment members 24 are connected to the frame rails 14 beneath the automobile body 12.

Figure 2A:
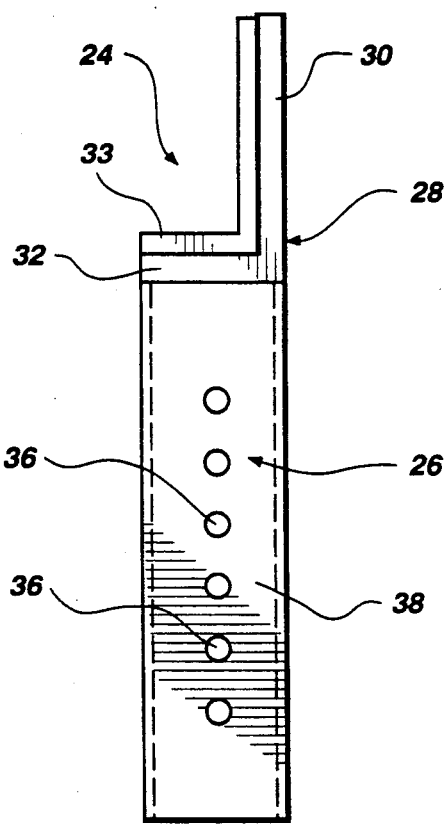
FIGS. 2A and 2B are front and side plan views respectively of an attachment member formed in accordance with the present invention; the other attachment member being substantially a mirror image thereof.
Figure 2B:
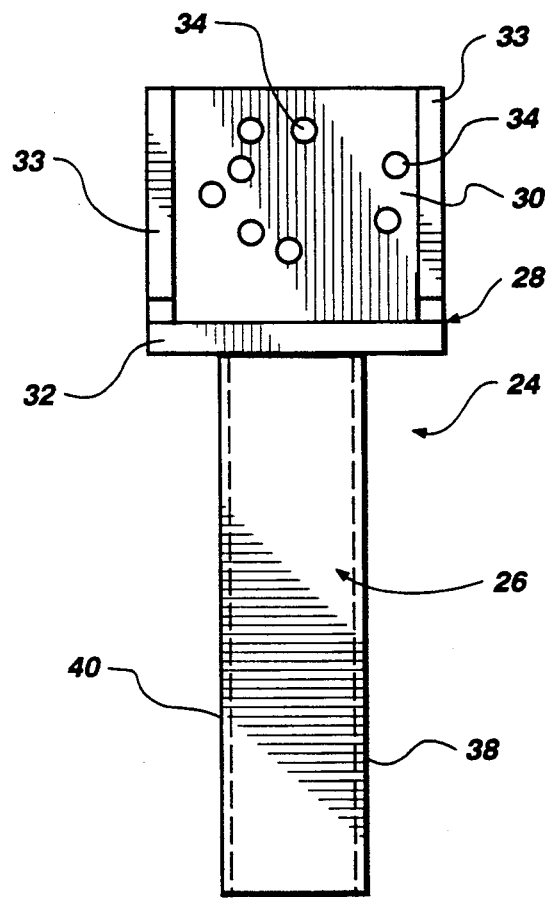

The individual components will now be described in greater detail in conjunction with FIGS. 2-6. Illustrated in FIGS. 2A and 2B are the front and side views, respectively, of an attachment member 24 that would be used on the driver's side frame rail 14 on the driver's side of the vehicle 12. The attachment member used on the other side of the vehicle is substantially a mirror image thereof and the description with respect to FIGS. 2A and 2B applies equally as well to the other attachment member. The attachment member 24 includes a post 26 depending from an attachment bracket 28. The attachment bracket 28 has an L-shaped cross sectional configuration with an upstanding flange 30 and a base leg 32 joined at one end at substantially a 90 degree angle, as shown more clearly in FIG. 2A. The attachment bracket 28 is sized and shaped to snugly fit against the lower outside corner of the vehicle frame rail. The post 26 is formed orthogonally to the base leg 32 such that when the attachment member 24 is attached to the vehicle frame rail 14, the post 26 will depend vertically downward and is attached to the base leg 32 by welding, but may also be integrally formed therewith. The width of the base leg 32 is substantially identical to the width of the post 26. However, it is to be understood that the base leg 32 may have a width sized as necessary to meet the needs of a particular application. An L-shaped bar 33 is attached to or formed on the bracket 28 adjacent the outside edges of the flange 30 and leg 32.

Because most conventional vehicle frame rails are formed with openings to permit the attachment of accessories, such as bumpers, etc., the upstanding flange 30 of the attachment bracket 28 of the present invention is formed to have a plurality of openings 34 arranged in a predetermined pattern such that the attachment member 24 can be bolted to a wide variety of vehicle frame rails. A plurality of openings 36 are also formed in the post 26 to enable attachment of the other components of the adjustable hitch assembly 10. More particularly, the post 26 has a front wall 38 and a back wall 40 in which the openings 36 are formed. This permits a bolt or other similar fastener to pass completely through the post 26.

Figure 3:
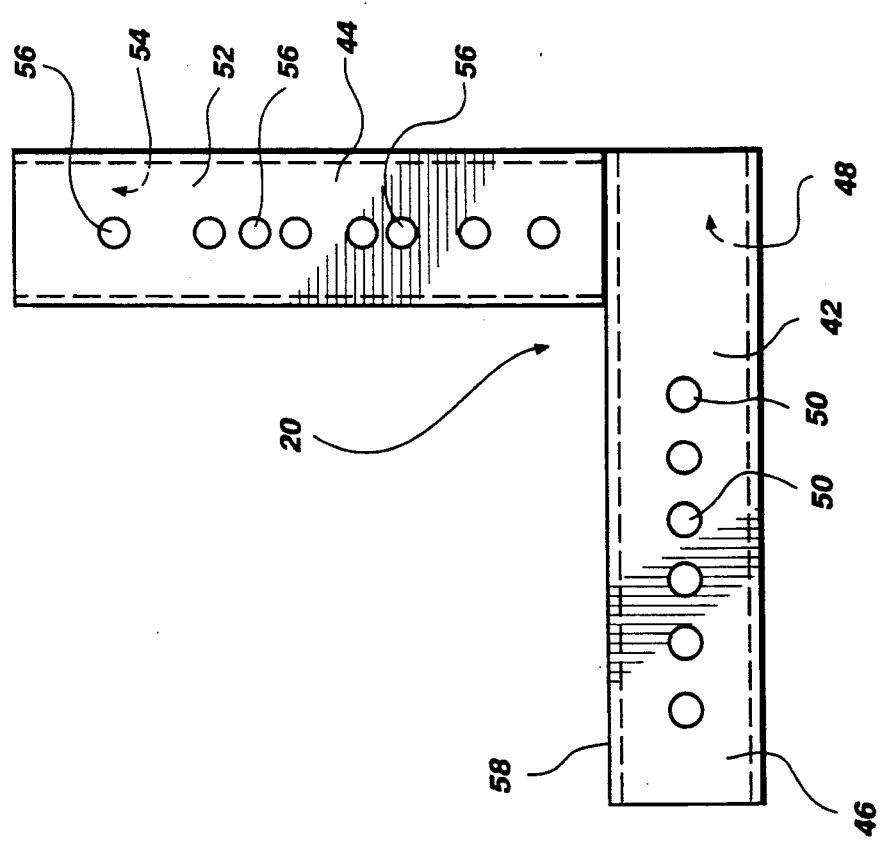
FIG. 3 is a top plan view of the right connector formed in accordance with the present invention, the left connector being substantially a mirror image thereof.

Illustrated in FIG. 3 is a connector 20 comprising a first arm 42 and a second arm 44 joined together at one of their ends at substantially a 90 degree angle. In the top plan view it can be seen that the first and second arms 42 and 44 have substantially the same width; however, the lengths are different, with the first arm 42 being longer than the second arm 44. The connector 20 illustrated in FIG. 3 is used on the driver's side of the hitch assembly, with the other side being substantially a mirror image therof. As such, the first arm 42 is used to adjust the depth of the hitch assembly 10 and the second arm 44 is used to adjust the width of the hitch assembly 10.

Ideally the first arm 42 and second arm 44 are joined by welding, but may be integrally formed together. With the second arm 44 abutting against the side wall 58 of the first arm 42, the connector 20 will have a substantial L-shape when viewed from the top.

The first arm 42 has a top wall 46 and a mutually-opposing bottom wall 48 (shown in FIG. 1) with a plurality of openings 50 formed therein to permit a fastener to pass completely through the first arm 42. These openings 50 are equidistantly spaced along the longitudinal axis of the first arm 42 at predetermined intervals. Similarly, the second arm 44 is substantially rectangular in shape having a top wall 52 and a mutually-opposing bottom wall 54. Eight openings 56 are formed in the top and bottom walls 52 and 54 to permit a fastener to be inserted through the second arm 44. The eight openings 56 illustrated in FIG. 3 in the second arm 44 are not equidistantly spaced along the longitudinal axis of the second arm 44. Rather, the openings 56 are spaced at varying intervals such that when the connectors 20 are joined with the receiver unit 18, the width of the hitch assembly can be adjusted to predetermined distances to match the conventional spacing of vehicle frame rails.

Figure 4A:
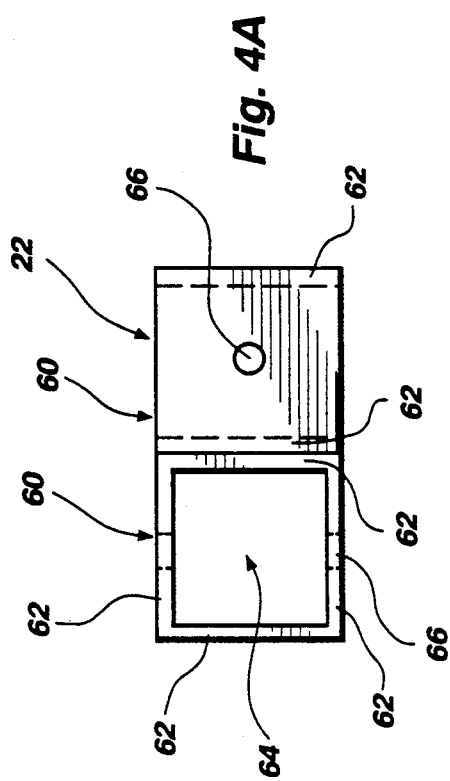
FIGS. 4A and 4B are front and top plan views respectively of a coupler formed in accordance with the present invention.
Figure 4B:
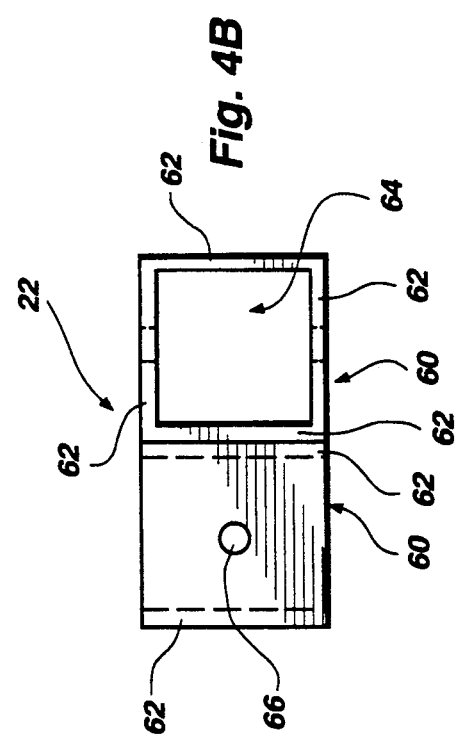

Referring next to FIGS. 4A and 4B, illustrated therein are the front and top plan views, respectively, of a coupler 22 formed in accordance with the present invention. Both couplers 22 used with the hitch assembly 10 of the present invention are identical; hence, only one coupler will be illustrated and described. The coupler 22 is substantially rectangular in shape and is formed by joining two substantially cube-shaped hollow tubes 60 together along one of their sides. Each cube-shaped tube 60 is identical, having four sidewalls 62 joined together to define a square-shaped bore 64. The cube-shaped tubes are joined together with the axis of their bores 64 rotated 90 degrees out of alignment. That is, the bore 64 of one tube 60 is horizontal and the bore of the other tube 60 will be vertical with the longitudinal axes of the bores lying in parallel planes. Because each of the cube-shaped tubes 60 are joined by their walls 62, both of the bores 64 will be open and unobstructed.

Each cube-shaped tube 60 has a pair of mutually-opposed openings 66 formed in the side wall 62 to permit a fastener to be inserted through the tube 60. Thus, each coupler 22 will have two pair of openings 66 formed therein (that are not in the common wall) to permit two fasteners to be inserted therethrough. The bore 64 is sized and shaped to permit the couplers to be slid over the first arm 42 of each connector 20 and the post 26 of each attachment member 24. Furthermore, the openings 66 in each coupler are sized and positioned to match and be aligned with the openings 50 and 36 formed in the connectors 20 and posts 26, respectively.

Referring next to FIGS. 5 and 6, illustrated therein is a yoke, denoted as a receiver unit 18 comprising a receiver tube 68 joined to a crossbar 70 and reinforced by a reinforcing plate 72. The receiver tube 68 comprises a top and bottom wall 74 and 76 and a pair of sidewalls 78 to define an internal axial bore 80. A collar 82 circumscribes one end of the receiver tube 68 while the other end is joined in abutting relationship to the crossbar 70. An opening 84 is formed in the sidewalls 78 to permit a fastener to be inserted horizontally through the side wall 78 and the bore 80 of the receiver tube 68. The receiver tube 68 is preferably sized and shaped to receive standard sized tongues of trailers and other attachment devices.

The crossbar 70 has a top wall 86, bottom wall 88, and mutually-opposing sidewalls 90 that define an elongate tube having an internal axial bore 92. The bore 92 preferably is sized and shaped to slidably receive the second arm 44 of the connectors 20. The receiver tube 68 is joined to one of the opposing sidewalls 90 to project outward at substantially a right angle from the crossbar 70. A pair of openings 94 are formed at each end of the crossbar 70 in the top wall 86 and in the bottom wall 88 and are in alignment to permit a fastener to be inserted through the cross bar 70.

The reinforcing plate 72 is attached to the bottom wall 76 of the receiver tube 68 and to the side wall 90 of the cross bar 70 to reinforce the attachment of the receiver tube 68 to the cross bar 70. In addition, an opening 96 is formed in the reinforcing plate 72 on each side of the receiver tube 68 to enable a chain to be attached thereto, such as a safety chain on a trailer.

Figure 7:
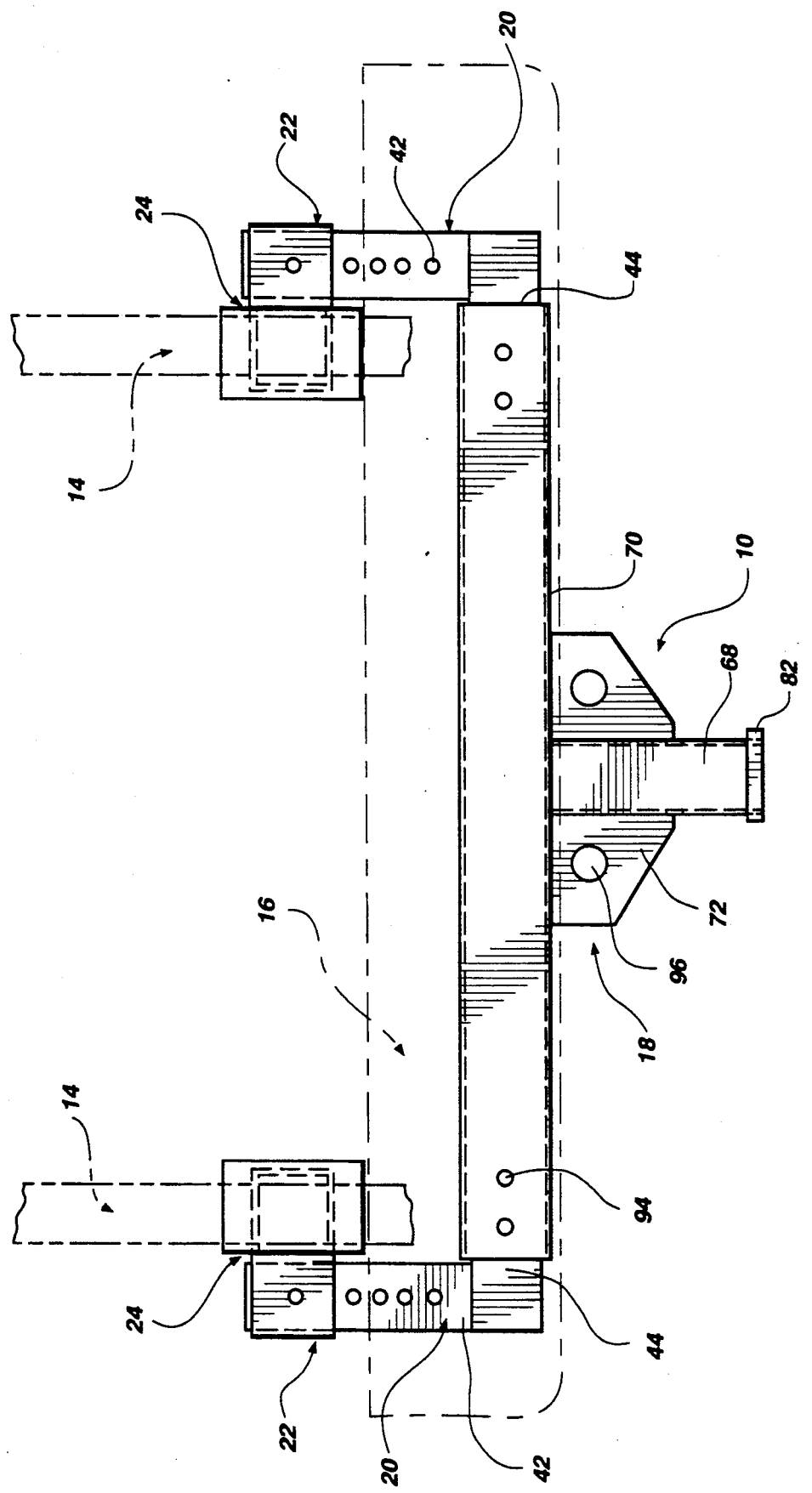
FIG. 7 is a top plan view of the assembled adjustable hitch assembly of FIG. 1.

FIG. 7 illustrates the adjustable hitch assembly 10 with all components assembled. The steps of assembly and attachment described below are not necessarily in a preferred order, and may be varied according to the needs of the particular application.

Initially, the attachment members 24 are positioned along the lower outside edges of the vehicle frame rails 14 and fastened through pre-existing openings in the frame rails 14 with fasteners 100 (shown in FIG. 1). The preformed pattern of openings 34 formed in the upright phalange 30 of the attachment bracket 28 allows the attachment member 24 to be bolted up to most existing frame rails 14. With the attachment member 24 bolted to the vehicle frame rail 14, the post 26 will be depending downward in substantially a vertical orientation. The couplers 22 are each slidably engaged with the post 26 by sliding the vertically oriented bore 64 over the post 26. The coupler 22 is temporarily held in position by inserting a fastener through the openings 66 in the coupler 22 and the openings 36 in the post 26.

The connectors 20 are then brought into engagement with the receiver unit 18 by sliding the second arms 44 into the bores 92 formed in each end of the crossbar 70. The crossbar 70 and slidably receiver connectors 20 are brought into engagement with the couplers 22 to fix the appropriate width by sliding the second arms 44 within the crossbar 70. When the width is determined, suitable fasteners are placed through the openings 94 in the cross bar 70 and the openings 56 in the first arms 44 to fixedly attach the connector 20 to the receiver unit 18.

The receiver unit 18 and attached connectors 20 are then moved forward and backward by sliding the first arms 42 within the bore 64 and the coupler 22 until the appropriate depth is reached. At that point, suitable fasteners are placed through the openings 66 in the couplers and the openings 50 in the first arms 42 to fixedly attach the connectors 20 to the couplers 22.

A final adjustment in height can be made by removing the fasteners from the opening 66 in the coupler and the openings 26 in the post 26 and sliding the coupler 20 along the post 26 until the appropriate height is reached. The fasteners are then replaced and tightened.

If desired, a bumper 16 may be attached to the receiver unit 18 by passing fasteners through the bottom of the bumper and through the openings 94 in the cross bar 70. This provides additional rigidity and strength to the adjustable hitch assembly 10 and further reinforces the bumper 16.

In order to provide strength, the components described above, including the receiver unit 18, the connector 20, the attachment member 24, and the coupler 22, are constructed of highstrength metal. For instance, the components can be constructed of 3" by 3" by either 3/16" or ¼" steel tube having a substantially square cross sectional shape. Tongue weights of 500 to 800 pounds are typical with a total weight of 5,000 to 8,000 pounds. A safety factor of up to 150% is obtained with the present invention. While the components may be connected together by welding, preferably fasteners such as nuts and bolts are used, thus enabling adjustment to meet particular towing needs.

While a preferred embodiment of the invention has been illustrated and described, it is to be understood that various changes may be made therein without departing from the spirit and scope of the invention. For instance, various combinations of couplers 22, connectors 20, and attachment members 24 can be used to achieve adjustment in three dimensions. By way of example, the coupler 22 can be slidably engaged over the outside of the cross bar 70 and the connectors 20 can be then slidably engaged with the couplers by sliding the first arm 42 into the couplers and having the second arm 44 vertically oriented. The second arm 44 is sized to be slidably received either over or within the post 26 on the attachment member 24. As such, the coupler coacts with the cross bar 70 to provide adjustment in width and the connector 20 coacts with the coupler 22 to provide adjustment in depth. Similarly, the connector 20 coacts with the attachment member 24 to provide adjustment in height.

By way of another example, the coupler 22 can coact with the attachment member 24 to provide adjustment in height and simultaneously coact with the connector 20 to provide adjustment in width. The connector 20 can then coact with a modified cross bar 70 to permit adjustment in depth. The cross bar 70 would be modified to include a cube-shaped tube with an axial bore oriented horizontally to permit adjustment in depth by slidably engaging the connector 20 within the cube-shaped tube.

Thus, the invention is not to be limited by the description of the preferred embodiment, but only by the scope of the claims that follow.

The embodiments of the invention in which an exclusive property or privilege is claimed are as follows:

1. An adjustable hitch assembly for vehicles having a body, a bumper, and a pair of mutually-opposing parallel frame rails, the hitch assembly comprising:
   a) a first attachment member and a second attachment member, each attachment member having an elongate post terminating at a first end and a second end, said second end adapted to be attached to the vehicle frame;
   b) a first connecting arm and a second connecting arm, each connecting arm having a first elongate leg and a second elongate leg joined at one of their ends at substantially a right angle;
   c) means for adjustably coupling said first attachment member to said first connecting arm and said second attachment member to said second connecting arm, said coupling means configured to enable adjustment of the position of said first and said second connecting arms relative to said first and said second attachment members along a vertical axis and along a first horizontal axis; and
   d) a receiver for receiving a trailer tongue, said receiver having means for engaging said first connecting arm and said second connecting arm to enable adjustment in the position of said first connecting arm and said second connecting arm relative to said receiver along a second horizontal axis, whereby said receiver can be mounted on a vehicle frame and selectively positioned in three dimensions.

2. The hitch assembly of claim 1, wherein said engaging means comprises a yoke having a first end and a second end configured for adjustable attachment with said first arm and said second arm, respectively.

3. The hitch assembly of claim 2, wherein said coupling means is configured such that adjustment along the first horizontal axis is substantially at a right angle to adjustment along the vertical axis.

4. The hitch assembly of claim 3, wherein said coupling means is further configured such that adjustment along the second horizontal axis is substantially at a right angle to adjustment along the first horizontal axis and the vertical axis.

5. The hitch assembly of claim 2, further including means for attaching said yoke to a bottom wall of the bumper.

6. An adjustable hitch assembly for vehicles having a pair of mutually-opposing frame members with a body and a bumper mounted thereto, the adjustable hitch assembly comprising:
   a) a receiver tube;
   b) a crossbar joined to said receiver tube;
   c) a left and right connector, said left and right connectors each having a pair of arms projecting outward at substantially right angles with respect to each other, at least one of said arms being sized and shaped to slidably engage said crossbar to permit adjustment in the width of the hitch assembly;
   d) an attachment post having an L-shaped bracket on one end thereof for attachment to one of the vehicle frame rails and a post depending downward from said L-shaped bracket when said L-shaped bracket is mounted on the vehicle frame rail; and
   e) a pair of couplers, each coupler having one end sized and shaped to engage the other of said arms of said connector to enable adjustment in the depth of said hitch assembly, and a second end that is sized and shaped to engage said attachment post to enable vertical adjustment of the hitch assembly, whereby the hitch assembly is adjustable in three dimensions.

7. The hitch assembly of claim 6, wherein said crossbar includes means for attaching said crossbar to a bottom wall on the bumper.

8. The hitch assembly of claim 7, wherein the joint of said crossbar and said receiver tube is reinforced by a reinforcing plate having at least one opening formed therein to enable the attachment of a safety chain.

9. An adjustable hitch assembly for vehicles comprising:
   a receiver member for receiving a trailer tongue;
   a linking arm means slidably engageable with said receiver member to enable selective positioning of said receiver member along a first horizontal axis;
   an attachment member means for mounting on a frame of said vehicle; and
   a coupler means having a first means for slidably engaging said linking arm means and a second means for slidably engaging said attachment member means to enable selective positioning of said receiver member along a second horizontal axis and a vertical axis, said first engaging means being positioned adjacent said second engaging means such that the second horizontal axis and the vertical axis are in different planes.

10. The hitch assembly of claim 9, wherein said linking arm means comprises a pair of linking arms.

11. The hitch assembly of claim 9, wherein said attachment member means comprises a pair of attachment member means wherein each attachment member is attached to a separate vehicle frame rail.

12. The hitch assembly of claim 9, wherein said coupler means comprises a pair of couplers.

13. The hitch assembly of claim 9, wherein said first engaging means and said second engaging means each comprises a U-shaped channel formed from a pair of opposing parallel arms projecting outward from a wall member, and further wherein the wall members of said first engaging means and said second engaging means are attached together.

14. The hitch assembly of claim 9, wherein said first engaging means and said second engaging means each comprises a tube having a longitudinal axial bore with a longitudinal axis, said tubes being joined together and oriented so that their longitudinal axes are substantially at right angles and in different planes.

15. The hitch assembly of claim 14, wherein each of said tubes has a substantially square cross-sectional shape.

* * * * *